United States Patent
Ganis et al.

(10) Patent No.: US 9,726,325 B2
(45) Date of Patent: Aug. 8, 2017

(54) COMPOSITE TUBE ASSEMBLIES AND METHODS

(71) Applicant: Goodrich Corporation, Charlotte, NC (US)

(72) Inventors: Rony Giovanni Ganis, Ontario (CA); Peter F. Giddings, Oxfordshire (GB)

(73) Assignee: GOODRICH CORPORATION, Charlotte, NC (US)

( * ) Notice: Subject to any disclaimer, the term of this patent is extended or adjusted under 35 U.S.C. 154(b) by 636 days.

(21) Appl. No.: 14/267,720

(22) Filed: May 1, 2014

(65) Prior Publication Data
US 2015/0316206 A1 Nov. 5, 2015

(51) Int. Cl.
*F16S 3/04* (2006.01)
*B32B 37/18* (2006.01)
*B32B 37/14* (2006.01)
*F16C 7/02* (2006.01)

(52) U.S. Cl.
CPC .............. *F16S 3/04* (2013.01); *B32B 37/142* (2013.01); *B32B 37/18* (2013.01); *F16C 7/026* (2013.01); *B32B 2597/00* (2013.01); *B32B 2605/08* (2013.01); *B32B 2605/18* (2013.01); *Y10T 428/13* (2015.01); *Y10T 428/1372* (2015.01)

(58) Field of Classification Search
CPC .......... F16S 3/04; B32B 37/18; B32B 37/142; B32B 2605/18; B32B 2605/08; B32B 2597/00; Y10T 428/13; Y10T 428/1372; F16C 7/026
See application file for complete search history.

(56) References Cited

U.S. PATENT DOCUMENTS

| | | | |
|---|---|---|---|
| 7,335,108 | B2 | 2/2008 | Lin et al. |
| 8,414,724 | B2 | 4/2013 | Schnelz |
| 8,430,759 | B2 | 4/2013 | Wanthal |
| 2013/0118301 | A1 | 5/2013 | Gallant et al. |

FOREIGN PATENT DOCUMENTS

| | | |
|---|---|---|
| EP | 365391 | 2/1992 |
| EP | 2607229 | 6/2013 |

OTHER PUBLICATIONS

Extended European Search Report dated Nov. 5, 2015 in European Application No. 15163762.6.

*Primary Examiner* — Michael C Miggins
(74) *Attorney, Agent, or Firm* — Snell & Wilmer, L.L.P.

(57) ABSTRACT

Composite tubes comprising a compression sleeve coupled to an inner surface of a composite tube, a carbon extrusion member disposed within the composite tube, and an end fitting comprising a locking feature, wherein the end fitting is coupled to an inner surface of the compression sleeve and the locking feature is configured to engage the carbon extrusion member are disclosed. Methods comprising coupling a compression sleeve to an inner surface of a distal end of a composite tube, placing a carbon extrusion member inside the compression sleeve and the composite tube, and disposing an end fitting on the distal end of the composite tube, wherein the end fitting comprises a locking feature configured to interact with the carbon extrusion member are also disclosed.

16 Claims, 6 Drawing Sheets

COMPOSITE TUBE ASSEMBLIES AND METHODS

FIELD

The present disclosure relates to composite tube assemblies and methods of manufacture of composite tube assemblies.

BACKGROUND

Composite tubes are often used due to their high strength and low weight in industries where weight is a significant factor, such as in the aircraft and automotive industry (e.g., a strut). Composite tubes often comprise fibers and/or filaments reinforced with thermosets and/or thermoplastics. Conventional composite tube assemblies typically have a metallic end fitting bonded to the composite tube and, thus, hinder reuse of the metallic end fittings when replacing a composite tube.

SUMMARY

Composite tube assemblies comprising a compression sleeve coupled to an inner surface of a composite tube, a carbon extrusion member disposed within the composite tube, and an end fitting comprising a locking feature, wherein the end fitting is coupled to an inner surface of the compression sleeve and the locking feature is configured to engage the carbon extrusion member are provided.

Methods are provided comprising coupling a compression sleeve to an inner surface of a distal end of a composite tube, placing a carbon extrusion member inside the compression sleeve and the composite tube, and disposing an end fitting on the distal end of the composite tube, wherein the end fitting comprises a locking feature configured to interact with the carbon extrusion member.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

Figure 1:
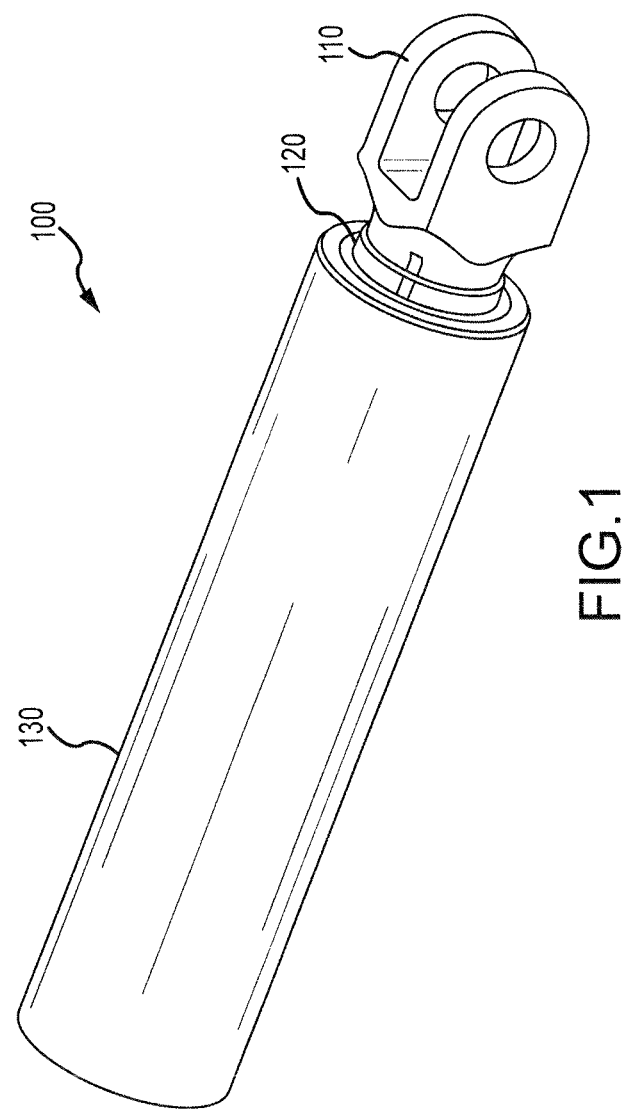
FIG. 1 illustrates a composite tube assembly, in accordance with various embodiments.

With reference to FIG. 1, FIG. 1 illustrates an external view of a composite tube assembly, in accordance with various embodiments. Composite tube assembly 100 may comprise composite tube 130, compression sleeve 120, and end fitting 110.

According to various embodiments, composite tube 130 may comprise lightweight polymer-matrix composite ("PMC") materials to utilize the anisotropic properties of the PMC material. As used herein, PMC materials may include carbon-fiber-reinforced polymers such as carbon-fiber-reinforced plastics and carbon-fiber reinforced thermoplastics, whether now known or hereinafter developed. As used herein, the term "carbon-fiber-reinforced polymer" may include any now known or hereinafter developed material that contains a fibrous material network (such as a network of carbon fibers) and a polymer, such as graphite epoxy. According to various embodiments, PMC materials may comprise any now known or hereinafter developed fibers. For example, in various embodiments, PMC materials may comprise aramid fibers and/or para-aramid fibers, such as Kevlar®, a registered mark of the E. I. Du Pont de Nemours and Company, Nomex®, also a registered mark of the E. I. Du Pont de Nemours and Company, and Technora®, a registered mark of the Teijin Corporation.

According to various embodiments, the end fitting is not particularly limited. According to various embodiments, the end fitting may comprise at least one of a clevis, a single bearing lug, and other known or hereinafter developed geometries for end fittings. In various embodiments, the end fitting may comprise various materials, for example, a metal. Exemplary metals according to various embodiments include at least one of aluminum, tungsten, titanium, nickel, molybdenum, steel, cobalt, chromium, and alloys thereof. For example, according to various embodiments, the end fitting may comprise various materials, for example, steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

In various embodiments, the compression sleeve is not particularly limited. For example, the compression sleeve may comprise a metal. Exemplary metals according to various embodiments include at least one of aluminum, tungsten, titanium, nickel, molybdenum, steel, cobalt, chromium, and alloys thereof. For example, according to various embodiments, the compression sleeve may comprise various materials, for example, steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

Figure 2:
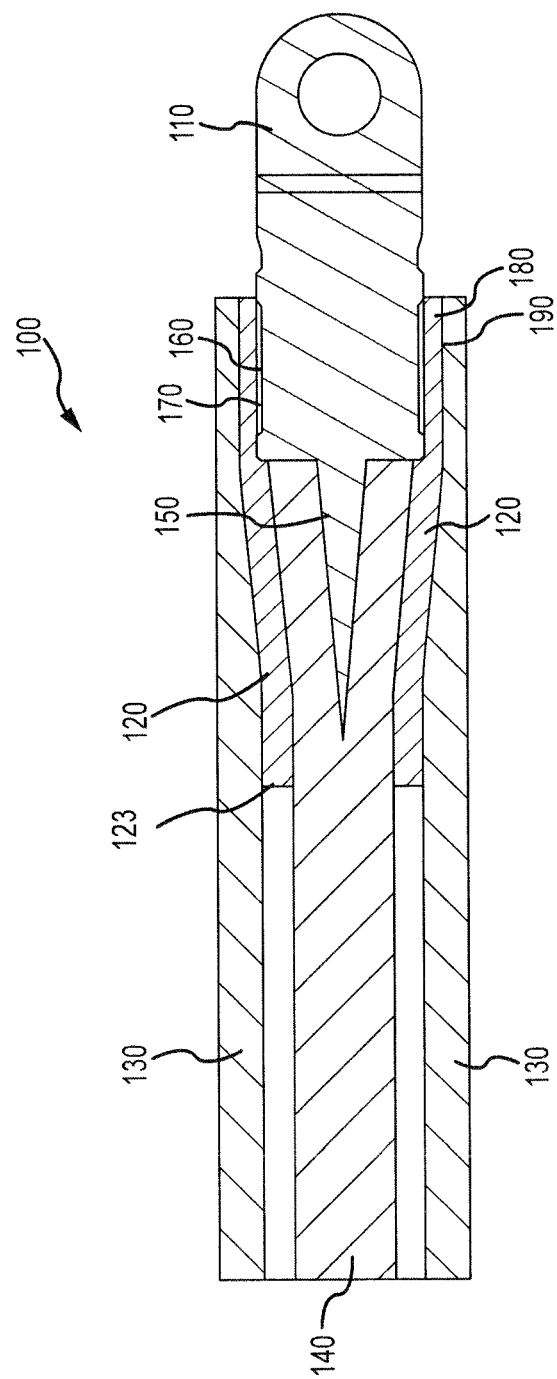
FIG. 2 illustrates a cross-sectional view of a composite tube assembly, in accordance with various embodiments.

With reference to FIG. 2, FIG. 2 illustrates a cross-sectional view of composite tube assembly 100 in accordance with various embodiments. In various embodiments, the compression sleeve 120 may be coupled to an inner surface 190 of a composite tube 130. In various embodiments, a proximal end 123 of compression sleeve 120 may have a constant outer diameter, as illustrated in FIG. 2. For example, FIG. 2 illustrates outer surface 180 of compression sleeve 120 coupled to inner surface 190 of the composite tube 130, according to various embodiments. In various embodiments, an outer surface 180 of the compression sleeve may be configured to interface with the inner surface 190 of the composite tube 130.

In various embodiments, composite tube assembly 100 may comprise a carbon extrusion member 140 disposed within the composite tube 130. Composite tube assembly 100 may also comprise end fitting 110 according to various embodiments. In various embodiments, the end fitting 110 may comprise a locking feature 150, wherein the end fitting 110 is coupled to an inner surface 170 of the compression sleeve 120 and the locking feature 150 is configured to engage the carbon extrusion member 140. In various embodiments, the end fitting may be threaded, so that end fitting threaded portion 160 may be configured to mate with corresponding threads on the inner surface 170 of compression sleeve 120.

Figure 3:
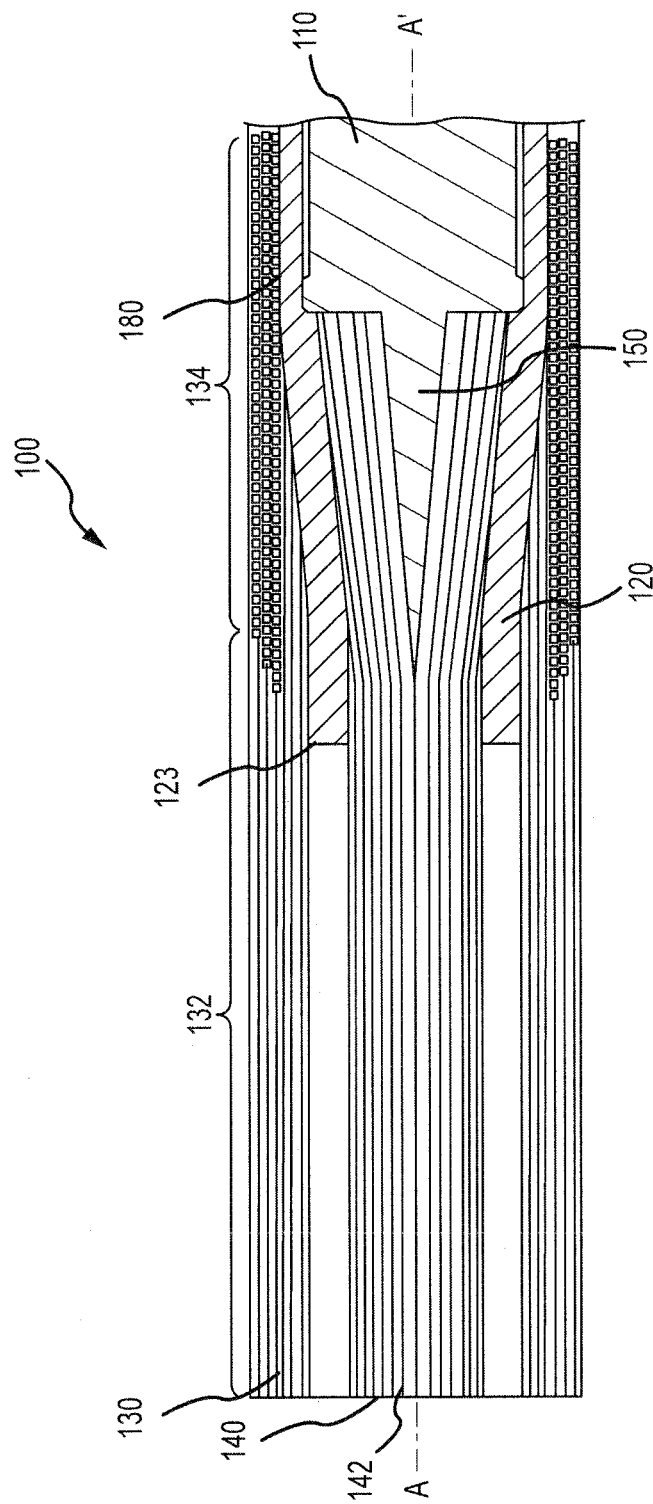
FIG. 3 illustrates a cross-sectional view of a composite tube assembly, in accordance with various embodiments.

With reference to FIG. 3, FIG. 3 illustrates a cross-sectional view of composite tube assembly 100 in accordance with various embodiments. As previously described, composite tubes according to various embodiments may utilize various anisotropic properties of fibers and/or filaments of the composite tube 130. For example, FIG. 3 illustrates composite tube assembly 100 having composite tube low angle carbon fibers 132, composite tube high angle carbon fibers 134, and the carbon extrusion member low angle carbon fibers 142 of carbon extrusion member 140 shown for improved clarity. In various embodiments, composite tube 130 may comprise composite tube high angle carbon fibers 134 at a distal end of the composite tube. Moreover, as can be seen in FIG. 3, carbon extrusion member 140 may also comprise a carbon extrusion member low angle carbon fibers 142.

As used herein, the term "low angle" may include fibers having primarily longitudinal/axial angles of 45 degrees and lower. For example, in various embodiments, composite tube low angle carbon fibers 132 may include fibers primarily aligned along the longitudinal axis of composite tube 130 and have little or no deflection along the axial direction (e.g., 45 degrees or less).

As used herein, the term "high angle" may include fibers having primarily longitudinal/axial angles of 80 degrees or higher. For example, in various embodiments, composite tube high angle carbon fibers 134 may include carbon fibers primarily aligned in the axial direction of composite tube and have little or no deflection along the longitudinal direction.

According to various embodiments, composite tube 130 and/or carbon extrusion member 140 may comprise intermediate angle carbon fibers. As used herein, the term "intermediate angle" may include fibers having primarily longitudinal/axial angles between 46 degrees and 79 degrees.

As can be seen in FIG. 3, in various embodiments, compression sleeve 120 may contact at least one of the composite tube high angle carbon fibers 134 and the composite tube low angle carbon fibers 132. According to various embodiments, the outer surface 180 of the compression sleeve 120 is not particularly limited and may contain at least one of various non-smooth surface, textured surfaces, and surface finishes configured to facilitate positive and efficient load transfer to at least one of the composite tube high angle carbon fibers 134 and the composite tube low angle carbon fibers 132. In various embodiments, the compression sleeve 120 may be coupled to the composite tube 130. Exemplary coupling methods include, according to various embodiments, at least one of bonding with an adhesive and/or co-curing the compression sleeve 120 with the composite tube 130. The particular adhesive is not particularly limited and may include any known or hereafter developed adhesive suitable for PMC materials, such as an epoxy adhesive. An exemplary epoxy adhesive, according to various embodiments, may include Epovex®, commercially available from Zyvex Performance Materials, Incorporated. As previously described, in various embodiments, a proximal end 123 of compression sleeve 120 may have a constant outer diameter.

Further, as can be seen in FIG. 3, a locking feature 150 may be configured to engage the carbon extrusion member 140. For example, locking feature 150 may be configured to engage the carbon extrusion member low angle carbon fibers 142 of carbon extrusion member 140. For example, in various embodiments, the locking feature 150 may be configured to radially expand the carbon extrusion member 140. According to various embodiments, the locking feature 150 may comprise at least one of a non-smooth surface, a textured surface, and a finished surface to facilitate positive and efficient load transfer to the carbon extrusion member low angle carbon fibers 142 of carbon extrusion member 140. According to various embodiments, the roughness ($R_a$) of the locking feature is not particularly limited and may range from about 1.97 μin (about 0.05 μm) to about 31.5 μin (about 0.8 μm), from about 3.9 μin (about 0.1 μm) to about 23.6 μin (about 0.6 μm), and from about 7.87 μin (about 0.2 μm) to about 15.7 μin (about 0.4 μm).

In various embodiments, the locking feature 150 and the end fitting 110 may be formed as an integral piece. As used herein, the term "integrated" or "integral" may include forming a single continuous piece. In various embodiments, the locking feature 150 and the end fitting 110 may comprise two pieces separately manufactured and configured to be coupled together. For example, locking feature 150 and end fitting 110 may be coupled by threaded engagement.

Figure 4:
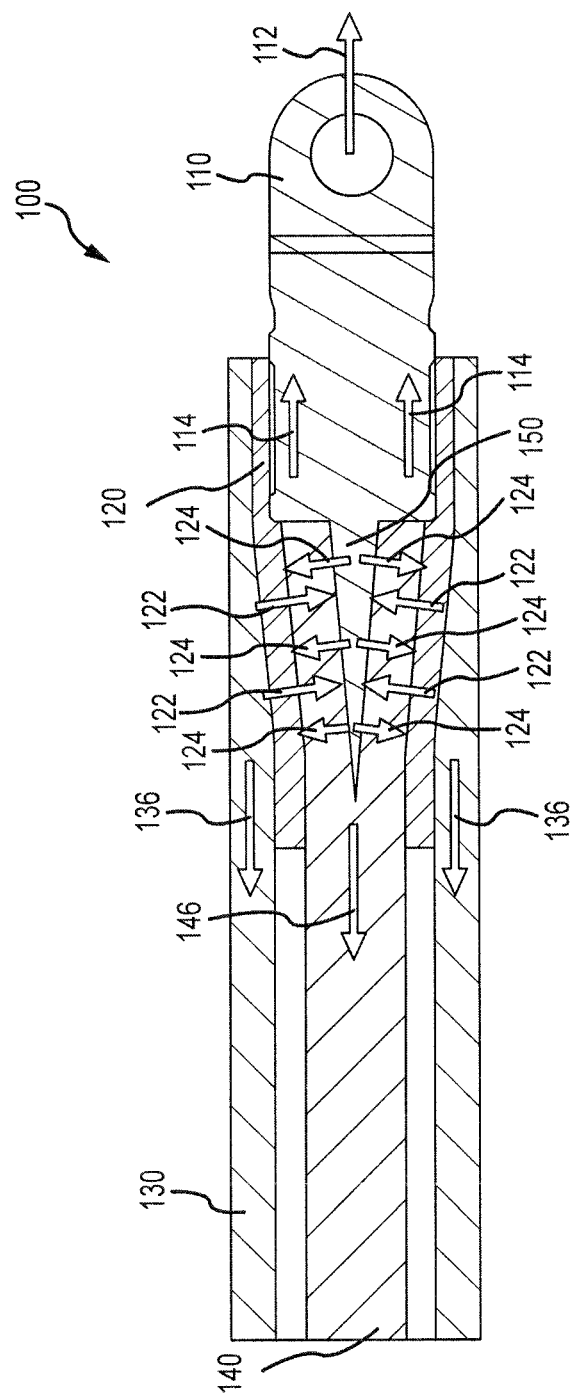
FIG. 4 illustrates a cross-sectional view of a composite tube assembly, in accordance with various embodiments.

With reference to FIG. 4, FIG. 4 illustrates a cross-sectional view of a composite tube assembly 100 under a tensile load, in accordance with various embodiments. In various embodiments, in response to tensile load 112 applied to end fitting 110, tensile force 114 may arise on the interface between end fitting 110 and compression sleeve 120. This may cause compression sleeve 120 to exert a radially inward compression force 122 against carbon extrusion member 140 and locking feature 150. In various embodiments, the placement of locking feature 150 may respond with a radially outward compression force 124. As used herein, the term "radially outward" may include a direction primarily directed away from the axis A-A' (as shown in FIG. 3). For example, in various embodiments a radially outward compressive force may not necessarily be orthogonal to axis A-A' shown in FIG. 3.

According to various embodiments, the placement of locking feature 150 may cause tensile force 146 on carbon extrusion member 140. In various embodiments, the coupling of the compression sleeve 120 to the composite tube high angle carbon fibers 134 (as shown in FIG. 3) at a distal end of the composite tube 130 may result in composite tube tensile force 136 along the carbon extrusion member low angle carbon fibers 142 in a longitudinal direction along axis A-A' of carbon extrusion member 140 (as shown in FIG. 3).

Figure 5:
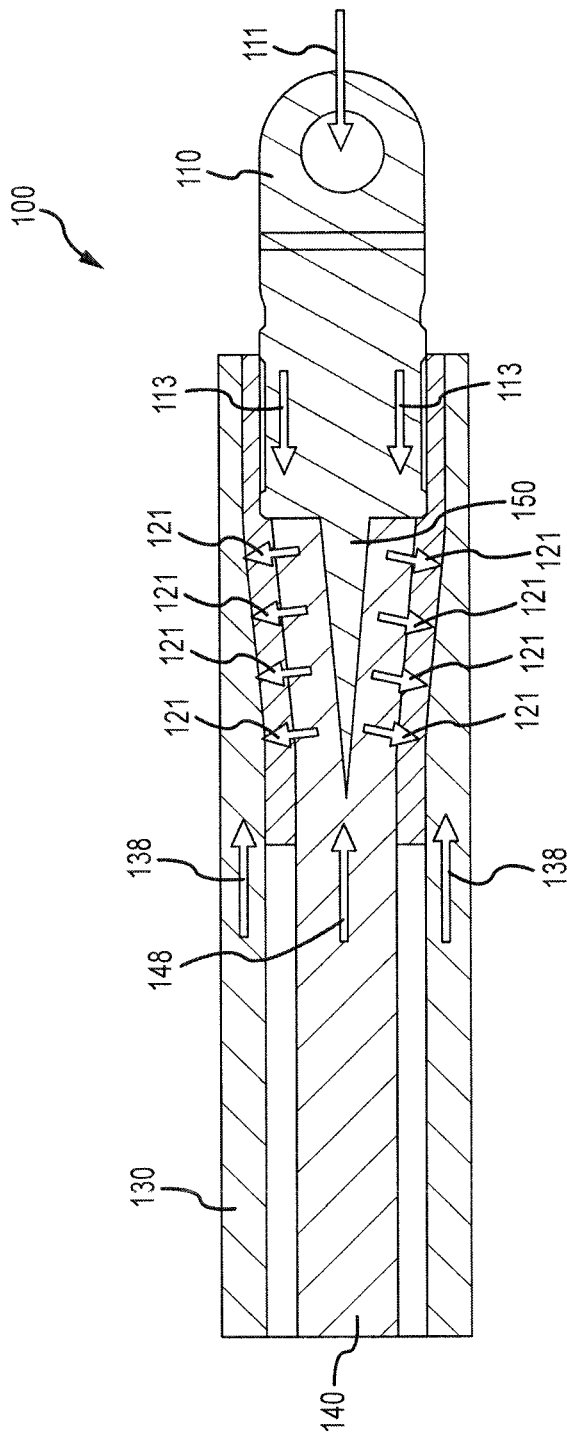
FIG. 5 illustrates a cross-sectional view of a composite tube assembly, in accordance with various embodiments.

With reference to FIG. 5, FIG. 5 illustrates a cross-sectional view of a composite tube assembly 100 under a compressive force, in accordance with various embodiments. In various embodiments, in response to longitudinal compressive force 111 applied to end fitting 110, an interface compressive force 113 may arise on end fitting 110 radially inward of compression sleeve 120. Further, in various embodiments, locking feature 150 may cause a compressive force 148 on carbon extrusion member 140. According to various embodiments, the compression sleeve 120 and the carbon extrusion member 140 may then cause an axial compressive force 121 against composite tube 130. In various embodiments, this may cause a longitudinal composite tube compressive force 138.

Figure 6:
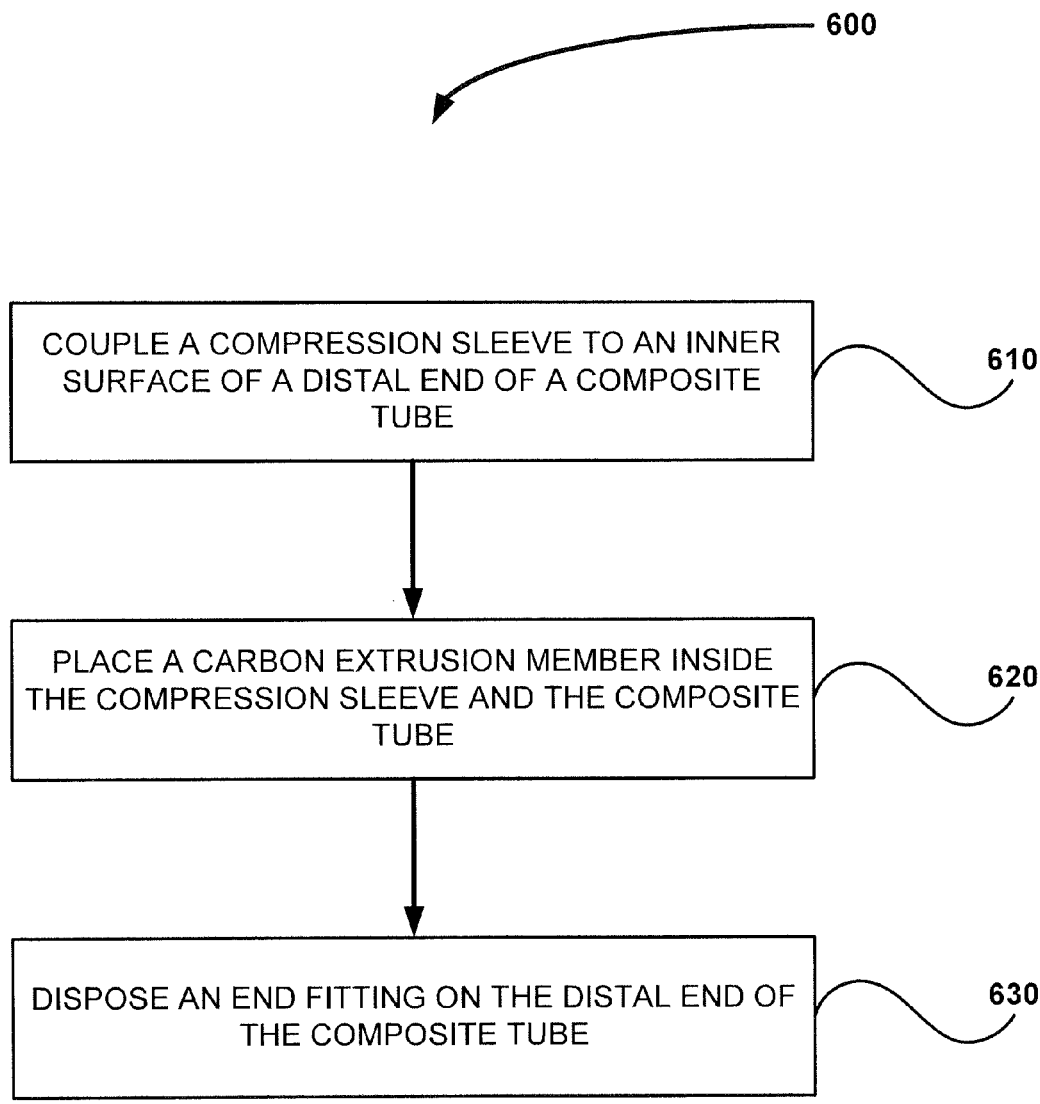
FIG. 6 illustrates methods of manufacture, in accordance with various embodiments.

With reference to FIG. 6, FIG. 6 illustrates methods of manufacture according to various embodiments. As illustrated in FIG. 6, method 600 may comprise coupling a compression sleeve to an inner surface of a distal end of a composite tube (step 610), according to various embodiments. In various embodiments, the coupling is not particularly limited. For example, according to various embodiments, the coupling may comprise co-curing the compression sleeve to an inner surface of a distal end of a composite tube. In various embodiments, the coupling may comprise coupling the compression sleeve to the inner surface of the distal end of the composite tube with an adhesive. The particular adhesive is not particularly limited and may include any known or hereafter developed adhesive suitable for use with PMC materials, such as an epoxy adhesive. An exemplary epoxy adhesive, according to various embodiments, may include Epovex®, commercially available from Zyvex Performance Materials, Incorporated.

In various embodiments, method 600 may comprise placing a carbon extrusion member 140 inside the compression sleeve 120 and the composite tube 130 (step 620). According to various embodiments, method 600 may comprise disposing an end fitting 110 on the distal end of the composite tube 130 (step 630). In various embodiments, the end fitting 110 may comprise a locking feature 150 configured to interact with the carbon extrusion member 140. Disposing the end fitting 110 on the distal end of the composite tube 130 is not particularly limited and may include, for example, screwing the end fitting 110 into the compression sleeve 120, according to various embodiments.

According to various embodiments, the composite tube assemblies and methods of manufacture may facilitate reuse of the metallic end fittings when replacing a composite tube. For example, in various embodiments, the end fitting and locking feature may be removed from one composite tube assembly (e.g., unscrewed) and placed in another composite tube assembly. In various embodiments, end fittings may be easily replaced by removing the end fitting and locking feature and installing a replacement end fitting and locking feature.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A composite tube assembly comprising:
a compression sleeve coupled to an inner surface of a composite tube;
a carbon extrusion member disposed within the composite tube; and
an end fitting comprising a locking feature extending from the end fitting, wherein the end fitting is coupled to an inner surface of the compression sleeve and the locking feature is configured to engage the carbon extrusion member.

2. The composite tube assembly of claim 1, wherein the end fitting is threaded.

3. The composite tube assembly of claim 1, wherein an outer surface of the compression sleeve is configured to interface with the inner surface of the composite tube.

4. The composite tube assembly of claim 1, wherein the composite tube comprises low angle carbon fibers.

5. The composite tube assembly of claim 1, wherein the composite tube comprises high angle carbon fibers at a distal end of the composite tube.

6. The composite tube assembly of claim 1, wherein the locking feature is configured to radially expand the carbon extrusion member.

7. The composite tube assembly of claim 1, wherein the end fitting and the compression sleeve comprise a metal.

8. The composite tube assembly of claim 1, wherein at least a portion of the carbon extrusion member is disposed within the compression sleeve.

9. The composite tube assembly of claim 1, wherein the composite tube is bonded with the compression sleeve.

10. The composite tube assembly of claim 9, wherein the composite tube is co-cured to the compression sleeve.

11. The composite tube assembly of claim 1, wherein the composite tube comprises a polymer-matrix composite.

12. The composite tube assembly of claim 11, wherein the composite tube comprises carbon fiber.

13. A method of manufacture comprising:
coupling a compression sleeve to an inner surface of a distal end of a composite tube;
placing a carbon extrusion member inside the compression sleeve and the composite tube; and
disposing an end fitting on the distal end of the composite tube, wherein the end fitting comprises a locking feature configured to interact with the carbon extrusion member.

14. The method according to claim 13, wherein the disposing the end fitting comprises screwing the end fitting into the compression sleeve.

15. The method according to claim 13, wherein the coupling comprises co-curing.

16. The method according to claim 13, wherein the coupling comprises coupling the compression sleeve to the inner surface of the distal end of the composite tube with an adhesive.

* * * * *